(12) United States Patent
Ernström et al.

(10) Patent No.: US 8,233,428 B2
(45) Date of Patent: Jul. 31, 2012

(54) USING A SYNCHRONIZATION CHANNEL TO SEND QUICK PAGING SIGNALS

(75) Inventors: Per Ernström, Stockholm (SE); Kumar Balachandran, Cary, NC (US); Havish Koorapaty, Cary, NC (US); Rajaram Ramesh, Raleigh, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 576 days.

(21) Appl. No.: 12/364,997

(22) Filed: Feb. 3, 2009

(65) Prior Publication Data

US 2010/0040015 A1 Feb. 18, 2010

Related U.S. Application Data

(60) Provisional application No. 61/088,450, filed on Aug. 13, 2008, provisional application No. 61/136,447, filed on Sep. 5, 2008.

(51) Int. Cl.
*H04B 7/212* (2006.01)
(52) U.S. Cl. ........................................................ 370/324
(58) Field of Classification Search .................. 370/330, 370/319, 324, 329, 344, 350, 478; 455/502
See application file for complete search history.

(56) References Cited

U.S. PATENT DOCUMENTS

| | | | |
|---|---|---|---|
| 2002/0177461 A1* | 11/2002 | Rosen et al. | 455/518 |
| 2003/0214937 A1 | 11/2003 | Lindoff et al. | |
| 2006/0209674 A1* | 9/2006 | Chen et al. | 370/209 |
| 2007/0140106 A1 | 6/2007 | Tsai et al. | |
| 2007/0142066 A1* | 6/2007 | Butler et al. | 455/458 |
| 2007/0249361 A1* | 10/2007 | Klang et al. | 455/452.2 |
| 2009/0238151 A1* | 9/2009 | Ramesh et al. | 370/335 |
| 2009/0280847 A1* | 11/2009 | Ramesh et al. | 455/515 |
| 2010/0260112 A1* | 10/2010 | Ramesh et al. | 370/328 |

FOREIGN PATENT DOCUMENTS

| | | |
|---|---|---|
| WO | WO2007/052399 A1 | 5/2007 |
| WO | WO 2007052399 A1 * | 5/2007 |

OTHER PUBLICATIONS

Tsai et al., IEEE C802.16m07/217, *Wake-up Sinai for 802.16m OFDMA Idle Mode*, IEEE 802.16 Broadband Wireless Access Working Group http://ieee802.org/16, Nov. 7, 2007.
Koorapaty et al., IEEE C802.16m-08/222, *802.16m Downlink Control Structures: Quick Paging Signal*, IEEE 802.16 Broadband Wireless Access Working Group http://ieee802.org/16.
Koorapaty et al., IEEE C802.16m-08/222r1, *802.16m Downlink Control Structures: Quick Paging Signal*, IEEE 802.16 Broadband Wireless Access Working Group http://ieee802.org/16.
Mohanty et al., IEEE C802.16m-08/663r1, *Proposal for IEEE 802.16m Quick Paging Channel Design*, IEEE 802.16. Broadband Wireless Access Working http://ieee802.org/16.
International Search Report and Written Opinion dated Jul. 2, 2009 in related international application No. PCT/SE2009/050200.
U.S. Appl. No. 12/808,779, filed Jun. 17, 2010; Inventor Ramesh et al.

* cited by examiner

*Primary Examiner* — Anh-Vu Ly
*Assistant Examiner* — Mang Yeung
(74) *Attorney, Agent, or Firm* — Nixon & Vanderhye P.C.

(57) ABSTRACT

In an orthogonal frequency division multiple access communication system, a base station transmits a quick paging signal simultaneously with a synchronization signal during the same transmission symbol time period. Even though these different signals are transmitted during the same transmission symbol time period, a periodicity of the synchronization signal is maintained to facilitate rapid and cost-effective synchronization by subscriber stations with the base station. The quick paging signal alerts subscriber stations about whether to stay awake for a subsequent page or to go into a power saving sleep mode.

35 Claims, 11 Drawing Sheets

USING A SYNCHRONIZATION CHANNEL TO SEND QUICK PAGING SIGNALS

PRIORITY APPLICATIONS

This application claims the priority benefit of U.S. provisional application 61/088,450, entitled "Quick Paging Signal and 16 m Specific Synchronization Channel," filed on Aug. 13, 2008, and of U.S. provisional application 61/136,447, entitled "Design for Quick Paging Signal with 16 m-Specific Synchronization Channel," filed on Sep. 5, 2008, the contents of which are incorporated here by reference.

TECHNICAL FIELD

The technology pertains to the field of telecommunications, and particularly, to quick paging employed in cellular telecommunications systems.

BACKGROUND

The IEEE 802.16 Working Group on Broadband Wireless Access Standards develops formal specifications for the global deployment of broadband Wireless Metropolitan Area Networks. Although the 802.16 family of standards is officially called Wireless MAN, it has been dubbed WiMAX by an industry group called the WiMAX Forum. IEEE 802.16e-2005 (formerly known as IEEE 802.16e) is in the lineage of the specification family and addresses mobility by implementing, e.g., a number of enhancements including better support for Quality of Service and the use of Scalable OFDMA. Like OFDM, OFDMA transmits a data stream by dividing the data stream over several narrow band sub-carriers (e.g. 512, 1024 or even more depending on the overall available bandwidth (e.g., 5, 10, 20 MHz) of the channel) which are transmitted simultaneously. As many bits are transported in parallel, the transmission speed on each subcarrier can be much lower than the overall resulting data rate. This is important in a practical radio environment in order to minimize effect of multipath fading created by slightly different arrival times of the signal from different directions. In general, the 802.16 standards essentially standardize two aspects of the air interface—the physical layer (PHY) and the media access control layer (MAC).

The WiMAX Forum has defined an architecture for connecting a WiMAX network with other networks, such as networks complying with IEEE 802.11and cellular networks, and a variety of other aspects of operating a WiMAX network, including address allocation, authentication, etc. FIGS. 1A and 1B show non-limiting examples of WiMAX networks, and it should be understood that the arrangement of functionalities depicted in FIGS. 1A and 1B can be modified in WiMAX and other communication systems.

As depicted in FIG. 1A, the network 100A includes base stations (BSs) 102, 104, 106, 108 that respectively transmit and receive radio signals in geographic areas called "cells", which typically overlap to some extent as shown. Subscriber stations (SSs) 110, 112 are located in the cells and exchange radio signals with the BSs according to the WiMAX air interface standard. An SS is typically either a mobile SS (MS) or a fixed SS, and it will be understood that a network can include many cells and many SSs. In FIG. 1A, the BSs communicate with and are controlled by Access Service Network (ASN) Gateways (G/Ws) 114, 116 that also communicate with each other, and with other core network nodes and communication networks (not shown), such as the public switched telephone network and the internet. SSs, such as SSs 110, 112, can be organized into groups for paging, as described in more detail below.

FIG. 1B depicts a WiMAX network 100B that also includes BSs 102, 104, 106, 108 and SSs 110, 112 as in the network 100A. The network 100B is more decentralized than the network 100A in that, in FIG. 1B, the BSs communicate with each other directly through a suitable routing network 118 that also communicates with other core network nodes and communication networks (not shown).

According to one mode of IEEE 802.16,the downlink (DL) radio signals transmitted by the BSs are orthogonal frequency division multiple access (OFDMA) signals. In an OFDMA communication system, a data stream to be transmitted by a BS to a SS is portioned among a number of narrowband subcarriers, or tones, that are transmitted in parallel. Different groups of subcarriers can be used at different times for different SSs. Because each subcarrier is narrowband, each subcarrier experiences mainly flat fading, which makes it easier for a SS to demodulate each subcarrier.

The DL radio signals and uplink (UL) radio signals transmitted by the SSs are organized as successions of OFDMA frames, which are depicted in FIGS. 2A, 2B according to a time-division duplex (TDD) arrangement in the IEEE 802.16e standard. FIG. 2B magnifies FIG. 2A and shows the format of the DL and UL subframes in more detail than in FIG. 2A. In FIGS. 2A, 2B, time, i.e., OFDMA symbol number, is shown in the horizontal direction and subchannel logical number, is indicated by the vertical direction. A subchannel is a pre-defined group of OFDM subcarrier frequencies that may be contiguous or non-contiguous. FIG. 2B shows one complete frame and a portion of a succeeding frame, with each DL subframe including sixteen symbols and each UL subframe including ten symbols, not counting guard symbols.

Each DL frame 200 starts with a preamble signal that includes a known binary signal sent on every third OFDM tone or subcarrier, as depicted by FIG. 3. The range of sub-carriers shown in FIG. 3 is numbered 0, 3, 6, . . . , 1701,but a preamble can use fewer than that many subcarriers.

As seen in FIGS. 2A, 2B, each frame's preamble is followed by a DL transmission period and then an UL transmission period. According to the WiMAX standard, the preamble signal is sent in the first OFDM symbol of a frame, which is identified by an index k in FIG. 2B, and is defined by the segment, i.e., one of the three sets of tones to be used, and a parameter IDCell, which is the transmitting cell's identification (ID) information. A SS uses the preamble for initial synchronization of its receiver to the BS (the network), and to determine the location of a frame control header (FCH), which is among the first bursts appearing in the DL portion of a frame. A SS also uses the preambles in signals transmitted by neighboring BSs to synchronize to them for purposes of measurement for handover from one cell to another.

The FCH gives information on the DL signal parameters, including a DL map message (DL-MAP), which is a medium access control (MAC) message that defines DL allocations for data, and parameters relevant for reception of the signal. The DL-MAP may be followed by an UL map message (UL-MAP), which provides UL allocations for data, and other parameters relevant for transmission of signals from an identified SS. With the assignments in time and frequency from the DL-MAP, an identified SS can receive the data in the particular location. Similarly, it can identify assignments in time and frequency on the UL-MAP, and transmit accordingly. FIGS. 2A, 2B also show a transmit/receive transition gap (TTG) interval and a receive/transmit transition gap (RTG) interval, which are used by the BS and SS to switch from transmit to receive and vice versa.

FIG. 2A also illustrates how a BS pages an SS operating in idle mode, showing the relationship between paging cycles, paging offset, BS paging interval, and OFDMA frames. Only two paging cycles are shown in FIG. 2A. An SS "listens" for a page message from the BS during only a portion of a paging cycle, and the location of that paging interval is determined by a paging offset from the start of the paging cycle. A paging message can span several OFDMA frames, which the SS needs to demodulate to read the entire message.

Thus, while a SS is idle, the SS periodically turns on its baseband processing unit, which includes a fast Fourier transform (FFT)-based demodulator and decoder, even when there are no paging messages for it and no system configuration changes/updates. The SS first synchronizes with the preamble and reads the FCH, and it then reads the DL-MAP to look for the location and the format of a broadcast connection identifier (CID). If the DL-MAP shows a broadcast CID, the SS demodulates that burst to determine whether there is a BS broadcast paging message (MOB_PAG-ADV).

Most of the time, there is no paging message and no action required by the SS, but during each paging interval, an SS has to be fully "awake", which is to say, its receiver has to be powered-up, for a number of OFDMA frames, using electrical power and draining a battery over time. In addition to MOB_PAG-ADV messages, changes in channel descriptors or broadcast system updates can trigger an idle SS to stay on for updating the system parameters or reading other coming messages.

A quick paging mechanism that can reduce the negative effects of the conventional paging mechanism is desirable for current and future versions of the WiMAX standards. In such a quick paging mechanism, a simple signal would indicate to a group of one or more SSs that a paging signal exists in a subsequently transmitted signal block. In effect, quick paging is a first part of a two-part paging process. During the first part, a shorter more ambiguous message is addressed to a group SSs to quickly inform them that there is a paging message intended for at least one member of the group in subsequent frames. On receipt of this quick paging message, members of the addressed group also monitor the information received in the second part corresponding to the actual paging message. Based on the paging message, which is not ambiguous, the SS can determine if it is being paged. SS's that are not addressed by the quick paging message go back to sleep and do not listen to the paging message, thus saving battery life.

Currently, a new standard for mobile radio broadband is being developed in IEEE 802.16m. This standard is required to be backwards compatible to mobile WiMAX system, i.e., IEEE 802.16e-2005, but may also have a non-backwards compatible mode. In developing IEEE 802.16m, a proposal has been made for a quick paging mechanism that is described in IEEE C802.16m07/217, "Wake-up Signal for 802.16m OFDMA Idle Mode" (Nov. 7, 2007). If an SS decodes the quick paging signal correctly, the SS needs to listen to the conventional paging signal; otherwise, the SS can go back to "sleep", thereby saving its resources, such as battery power. But this proposal either takes resources away from the available system resources, thereby reducing system capacity, or occupies transmit and receive gaps in a time-division duplex (TDD) version of the system, that may lead to compatibility issues among different device implementations.

The design of the synchronization channel (SCH) for IEEE 802.16m has not yet been completed. In backwards compatible mode, the preamble (i.e., the legacy synchronization channel) would have to be present, but could be sent in addition to a new IEEE 802.16m-specific SCH. In a non-backwards compatible mode, the legacy preamble would not have to be present. It is possible to use a non-hierarchical SCH, or a hierarchical SCH based on a primary SCH (P-SCH) used for initial acquisition and common to all sectors and cells and a secondary SCH (S-SCH) used for fine synchronization and carrying sector/cell ID information. A working assumption in the 802.16m system description document IEEE 802.16m-08/003r4, the disclosure of which is incorporated herein by reference, is that either the P-SCH (hierarchical case) or the SCH (non-hierarchical case) is mapped onto every other sub-carrier in the frequency domain. Similarly, the S-SCH (hierarchical case) is mapped onto every Nth sub-carrier (the value N is not specified but could be a number such as 3 for example). For the hierarchical case, it is alternatively possible to reuse the legacy preamble as S-SCH (hierarchical case). The legacy preamble is sent on every third sub-carrier.

If the entire system bandwidth in IEEE 802.16m is used for the SCH, then SSs that are not capable of receiving that entire bandwidth can not utilize the full SCH. As a result, such a SS will suffer reduced synchronization accuracy or may even be incapable of synchronization. On the other hand, if a sub-band of the full system bandwidth is used for the SCH, frequency division multiplexed (FDM) with data and/or control signaling transmitted outside the sub-band used for the SCH, then the OFDMA symbol can not be made periodic over a fraction of the OFDMA useful symbol time. That lack of periodicity complicates the synchronization process in the subscriber station adding delay to the process and expense to the subscriber station. With a periodic synchronization signal, all that the subscriber station needs to look for is a signal or code that repeats multiple times. It is not necessary for the subscriber station to know the value of a particular code or to detect and match/correlate the detected code with some other specific code in order for synchronization to be obtained. As long as the subscriber station detects that the same signal/code is being repeated with the periodicity of every Nth subcarrier, the subscriber station knows that it is a synchronization signal and can quickly and cost-effectively obtain synchronization with the base station. However, if every Nth subcarrier is utilized within a sub-band of the entire available frequency band for a symbol transmission period, then the subscriber station will not receive a periodic synchronization signal over the OFDMA useful symbol time. This means that the benefits associated with a periodic synchronization signal are not obtained.

The inventors recognized that a problem with a quick paging solution that is based on or designed for the legacy preamble for synchronization is that the legacy preamble may not be present in the non-backwards compatible mode of 802.16 m. In that case, the non-backwards compatible mode of 802.16 m would miss out on the benefits of quick paging. Also, if a quick paging indicator is not transmitted simultaneously with the SCH, then the SS needs to stay awake for a longer time which reduces its battery life. It also requires the SS to perform one or more extra steps, such as reading the frame control header to acquire frame configuration parameters, before being able to read the paging indicator.

Thus, if a quick paging signal is not sent simultaneously with the SCH, an idle subscriber station must stay awake (i.e., the receiver is powered on) both during the SCH transmission (to achieve synchronization and thus enable quick paging signal detection) and during the quick paging signal transmission. The longer the subscriber station needs to stay awake, the more power is consumed and the faster the battery life is reduced.

SUMMARY

A base station transmits a quick paging signal simultaneously with a synchronization signal during the same transmission symbol time period using available radio resources. Even though these different signals are transmitted during the same transmission symbol time period, a periodicity of the synchronization signal is maintained to facilitate rapid and cost-effective synchronization by subscriber stations with the base station. The quick paging signal alerts subscriber stations about whether to stay awake for a subsequent page or to go into a power saving sleep mode. Transmitting a first quick paging signal with a first value indicates that a paging signal will be subsequently transmitted, and transmitting a second quick paging signal with a second value indicates that the paging signal will not be subsequently transmitted. The quick paging signal may for example identify a set of subscriber terminals or groups of subscriber terminals that a base station is planning on transmitting a paging signal. Preferably, the communication system uses a plurality of subcarriers for orthogonal frequency division multiple access (OFDMA).

Quick paging signals are preferably transmitted using orthogonal quick paging code words so that transmitting a first quick paging code word indicates that a paging signal will be subsequently transmitted and transmitting a second quick paging code word indicates that the paging signal will not be subsequently transmitted. In one example embodiment, the available radio resources include a first set of subcarriers corresponding to an entire available frequency bandwidth during the transmission symbol time period. The base station transmits the synchronization signal on every Nth subcarrier in the first set of subcarriers, N being a positive integer, such that periodicity of transmission of the synchronization signal is maintained over the entire available frequency bandwidth. In a first example implementation, the quick paging signal is transmitted on subcarriers in the first set of subcarriers but other than the Nth subcarriers themselves.

In a second example implementation, the available radio resources include a first set of contiguous subcarriers corresponding to part of an entire available frequency bandwidth during the transmission symbol time period. The quick paging signal is transmitted on subcarriers within the first set of contiguous subcarriers other than the Nth subcarriers. The quick paging signal is preferably transmitted in this example at power level lower than a power level used to transmit the synchronization signal.

In a third example implementation, the available radio resources include a first set of contiguous subcarriers corresponding to part of an entire available frequency bandwidth during the transmission symbol time period, but the quick paging signal is transmitted on subcarriers other than subcarriers in the first set of contiguous subcarriers. In other words, the quick paging signal is transmitted on subcarriers in a different frequency sub-band than the sub-band corresponding to the first set of contiguous subcarriers where the synchronization signal is transmitted. In this case, the quick paging signal may be transmitted at a same or similar power level as a power level used to transmit the synchronization signal.

In another example embodiment, the base station may transmit pilot symbols having known symbol values during the same transmission symbol time period that can be used by the receiver to help demodulate the quick paging signals.

From the subscriber station perspective, a signal is received that includes a synchronization signal carried on every Nth subcarrier in a set of subcarriers, N being a positive integer, and a quick paging signal carried on other subcarriers different from the Nth subcarriers. The Nth and other subcarriers were transmitted together by a base station during a same transmission symbol time period. The subscriber station uses the synchronization signal carried on every Nth subcarrier in the set of subcarriers to synchronize with the base station. A value of the quick paging signal is detected in order to determine whether to receive a subsequent paging signal associated with the quick paging signal. For example, if the value of the quick paging signal is a first value, the subscriber station stays awake to receive and demodulate the subsequent paging signal, and if the value of the quick paging signal is a second value, the subscriber station goes into a power saving or sleep operational mode.

In a first example implementation of the subscriber station, the set of subcarriers defines a first frequency band of contiguous subcarriers. The first frequency band may be part or all of the available bandwidth during that transmission symbol time period. The other subcarriers carrying the quick paging signal are in the first frequency band but are different from the Nth subcarriers. The Nth subcarriers carrying the synchronization signal are preferably received at a higher power level than the other subcarriers carrying the quick paging signal. The quick paging signal corresponds to one of multiple orthogonal quick paging code words carried on the other subcarriers. A correlator correlates the quick paging signal with one of the quick paging code words associated with the subscriber station.

In a second example implementation, the other subcarriers carrying the quick paging signal are carried in a second different frequency sub-band. In this case, the set of subcarriers carrying the synchronization signal are received at a same or similar power level as the other subcarriers carrying the quick paging signal. The received signal is processed to detect repetitive signal properties of the synchronization signal for synchronization with the base station. For example, the received signal may be filtered, e.g., using an analog or digital filter, to isolate the set of subcarriers. The filtered signal is then processed to detect repetitive properties of the synchronization signal to achieve synchronization with the base station. Another approach is to filter the received signal in order to isolate the second frequency sub-band and demodulate the isolated second frequency sub-band to detect quick paging information.

Another aspect is that known pilot symbols associated with the quick paging signal may be used to determine radio channel estimates which then may be used to process the quick paging signal. The synchronization signal may also be used to determine radio channel estimates.

DETAILED DESCRIPTION

Figure 1A:
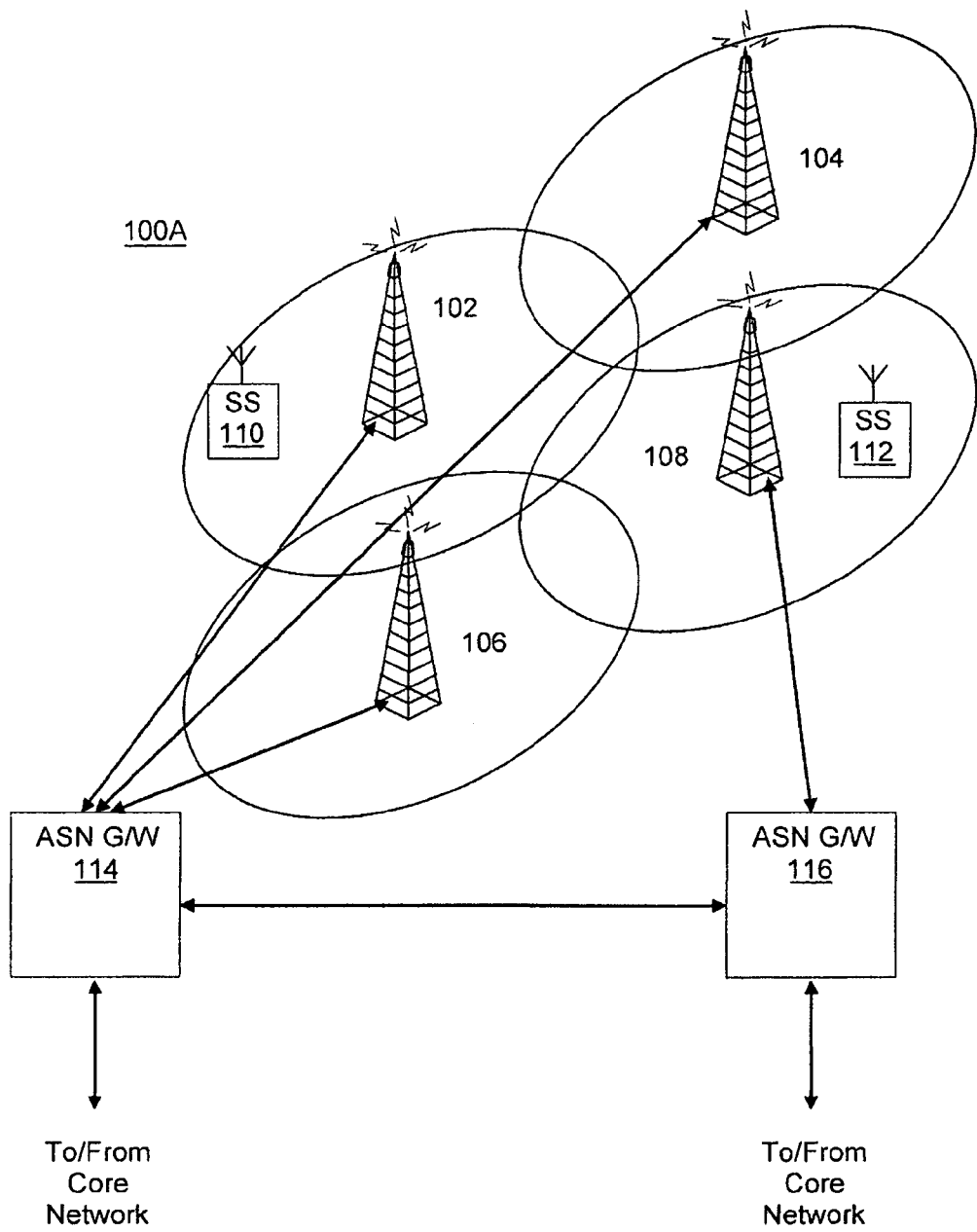
FIGS. 1A, 1B depict examples of telecommunication networks.
Figure 1B:
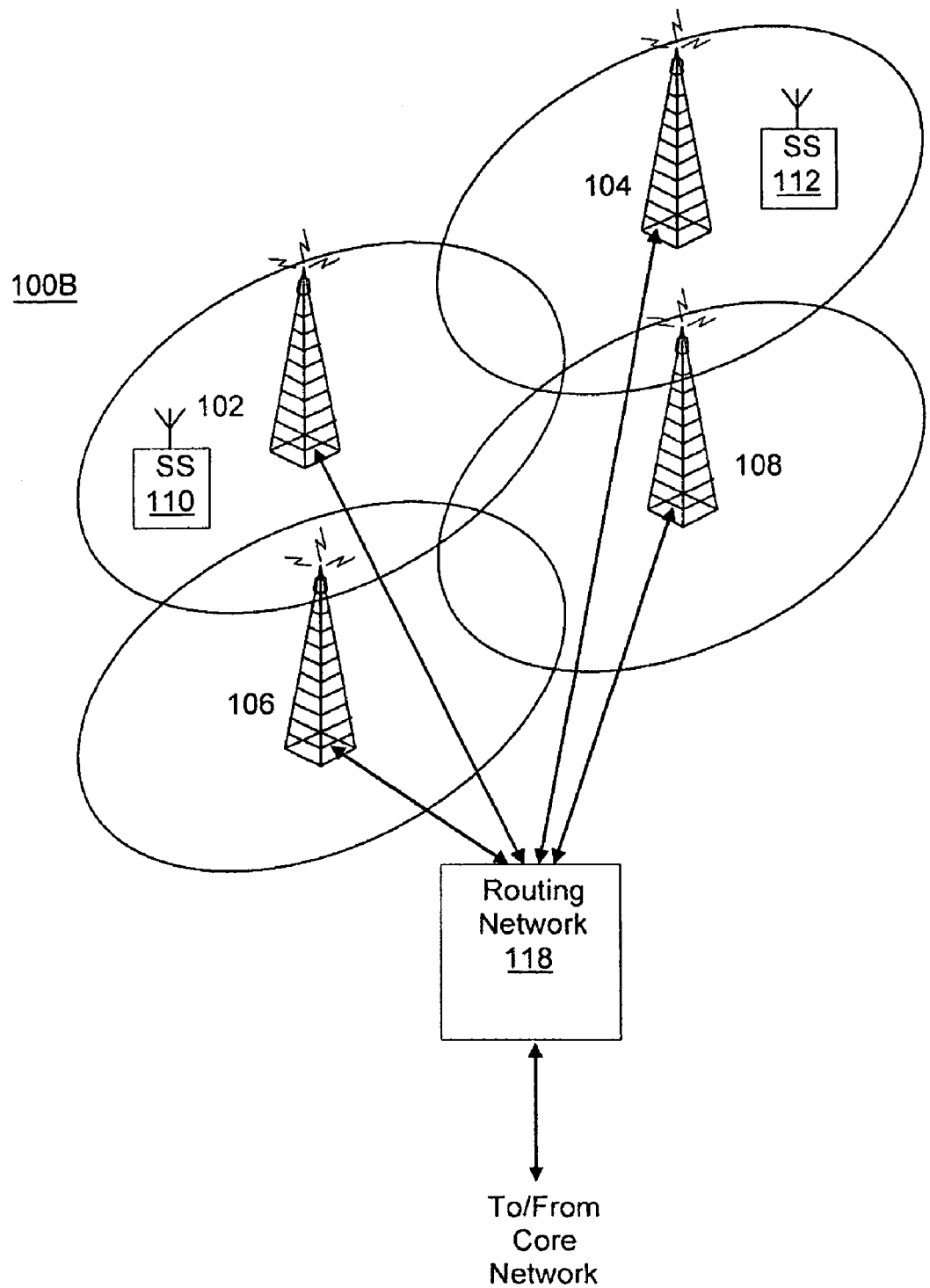
Figure 2A:
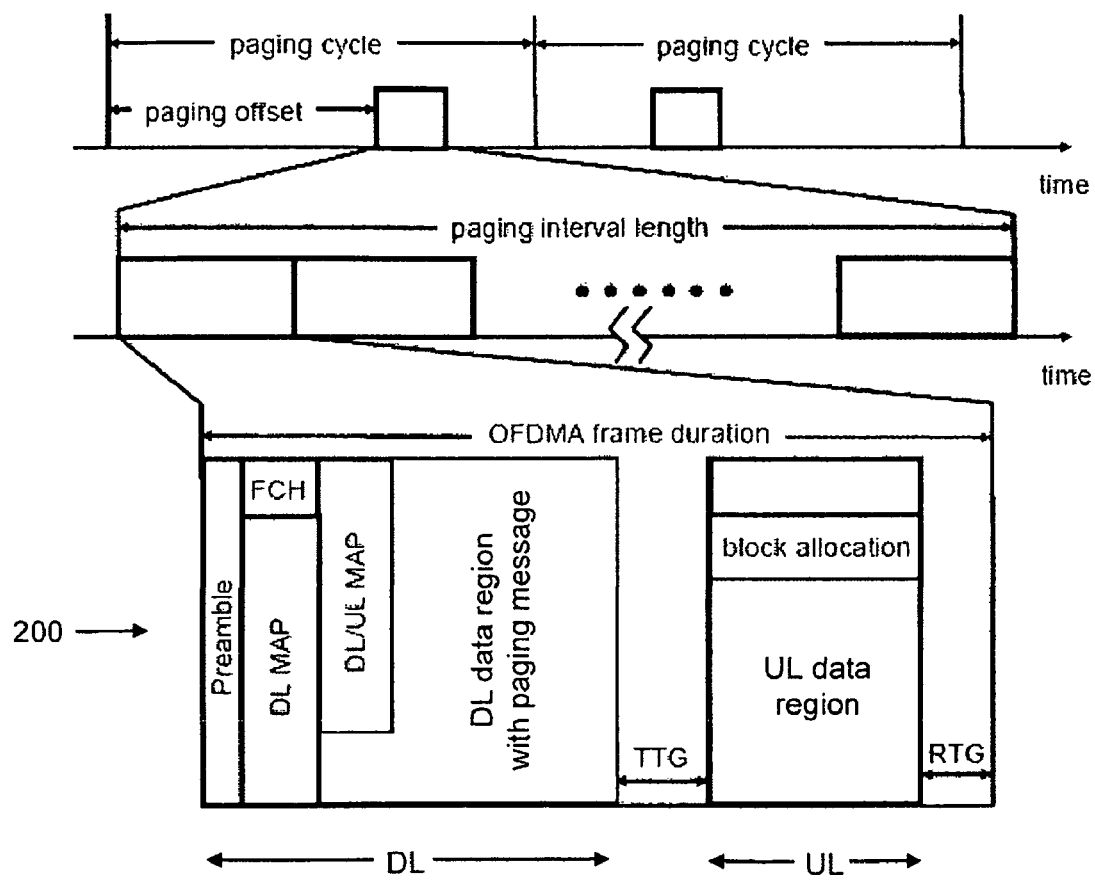
FIGS. 2A, 2B depict downlink and uplink signals organized as successions of frames.
Figure 2B:
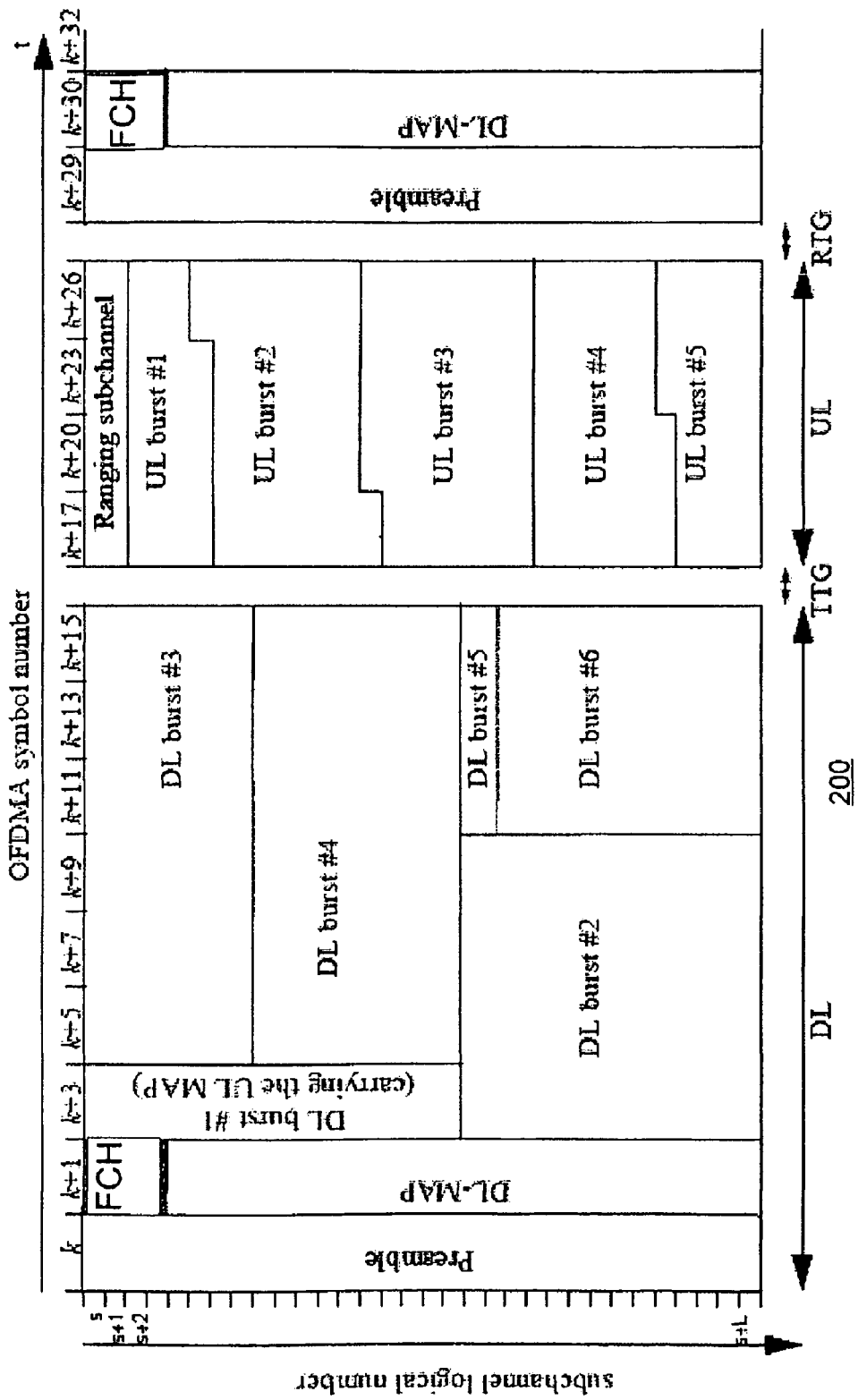

In the following description, for purposes of explanation and not limitation, specific details are set forth such as particular architectures, interfaces, techniques, etc. However, it will be apparent to those skilled in the art that the claimed technology may be practiced in other embodiments that depart from these specific details. That is, those skilled in the art will be able to devise various arrangements which, although not explicitly described or shown herein, embody the principles of the claimed technology and are included within its spirit and scope. In some instances, detailed descriptions of well-known devices, circuits, and methods are omitted so as not to obscure the description with unnecessary detail. All statements herein reciting principles, aspects, and embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein represent conceptual views of illustrative circuitry embodying the principles of the technology. Similarly, it will be appreciated various processes described may be substantially represented in a computer-readable medium and can be executed by a computer or processor.

The functions of the various elements including functional blocks labeled or described as "processor" or "controller" or "computer" may be provided through the use of dedicated hardware as well as hardware capable of executing software. When provided by a processor, the functions may be provided by a single dedicated processor, by a single shared processor, or by a plurality of individual processors, some of which may be shared or distributed. Moreover, a "processor" or "controller" may include, without limitation, digital signal processor (DSP) hardware, ASIC hardware, read only memory (ROM), random access memory (RAM), and/or other storage media.

This description focuses on a radio communication system according to the WiMAX standards, but the technology in general covers other wireless communication systems. Thus, an OFDMA system is assumed for illustration purposes only. The acronym SCH may refer to a synchronization channel in any wireless OFDM/OFDMA-based system and includes for example the SCH, P-SCH, or S-SCH (or any other nomenclature that may be used to denote the synchronization channels) in the system currently being designed in IEEE 802.16m.

A base station (BS) may select for the synchronization signal a preamble or other known sequence to transmit over the SCH. An OFDMA-based synchronization signal is preferably sent on every Nth OFDMA sub-carrier over an entire or part of an available frequency band, where N is a positive integer number. This makes the signal periodic with period $T_u/N$ within the OFDMA symbol time, where $T_u$ is the OFDMA symbol transmission time period (without the cyclic prefix), and $\Delta f = 1/T_u$ is the sub-carrier spacing. $T_u$ can be viewed as the useful symbol length. As explained earlier, the periodicity of the SCH signal can be used by the receiver to simplify synchronization and or to achieve better synchronization accuracy. The frequency domain synchronization signal is only present in every Nth subcarrier, with the subcarriers in between being at or near zero, and as a result, the corresponding time domain waveform is a signal which is periodic with period $T_u/N$ within one OFDMA symbol time. Thus, the subscriber station can search sequentially for a signal which is one OFDMA symbol time long and which is periodic with period $T_u/N$ within that time, and quickly acquire coarse synchronization with the base station. Advantageously, the subscriber station does not need to know the actual value of the synchronization signal; rather, all the subscriber station needs to detect is that the received signal has the correct periodicity property.

Using every Nth subcarrier also allows frequency re-use of the synchronization channel to improve coverage for the synchronization channel. The subcarriers used for the synchronization channel in two different cells or sectors may be shifted by a number of subcarriers (0 to N-1). For a SCH which does not carry a cell/sector ID and is identical in all cells and sectors, it may be more efficient not to use frequency re-use for the SCH but rather to allow the subscriber station to combine the synchronization signal from different cells and sectors. This may be applicable to the P-SCH being discussed for IEEE802.16m.

Figure 3:
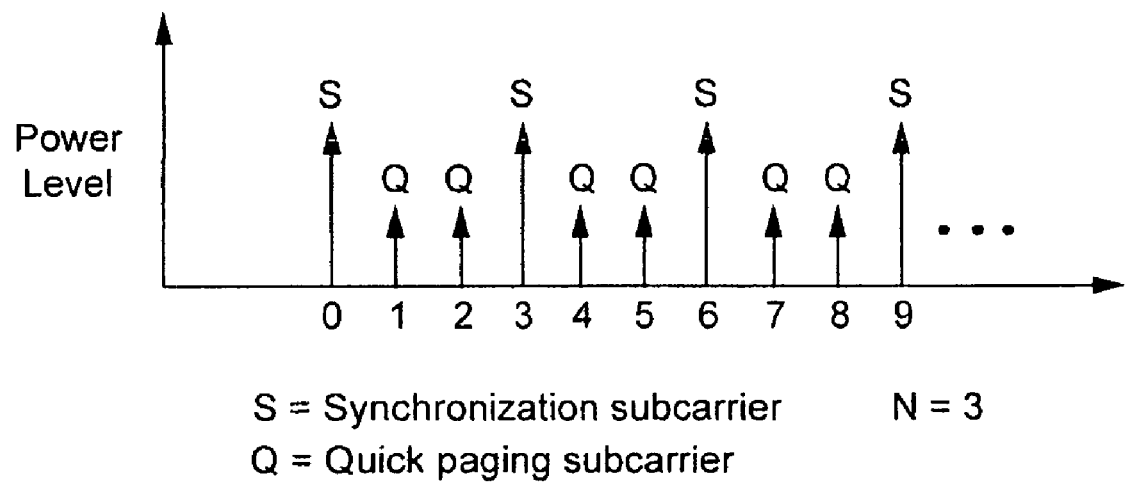
FIG. 3 depicts an arrangement of subcarriers for carrying both quick paging and synchronization signals.

The inventors realized that it would be desirable to have quick paging signals be carried by SCH subcarriers that are not being used to carry periodic synchronization signals. FIG. 3 illustrates an example of synchronization signals being carried by every third subcarrier, N=3 and two quick paging subcarriers being carried by the two subcarriers in between each of the synchronization subcarriers. Of course, N could be something other than 3. The periodicity of the synchronization subcarriers is maintained which results in easier and simpler synchronization in the receiving subscriber station, and at the same time, quick paging signals are sent to the subscriber stations allowing faster quick paging decisions. As shown in FIG. 3, the power level of the synchronization signal is significantly greater than the transmission power level of the quick paging signals so that the quick paging signals do not interfere in a substantial way with the synchronization signal or its desirable periodicity. The quick paging signal is modulated using a predetermined modulation and coding scheme.

The message sent using the Quick Paging signal identifies a set of SSs to whom the base station is planning to send a paging signal in a subsequent frame. The paging signal is sent as part of the data portion of the subsequent frame, and the allocation to the particular SS may be signaled in the MAP message of that subsequent frame. One or more paging groups of which the MS is a member may also be identified, for example, by specifying the identity of a group as a hash of the SS identifier (ID). The Quick Paging signal may identify the groups to which a paging signal is to be sent, and all SSs belonging to that group may be required to read the full paging signal sent in the subsequent frame.

Given that the actual paging signal is sent on a subsequent frame to where a paging indication is received, the SS can receive the OFDM symbol containing the SCH and quick paging signals in the first frame and move to sleep mode immediately unless the quick page indicates the page may be for the SS. The SS demodulates and decodes the QP signal using the preset modulation and coding scheme. Since the SS is more likely not to receive a paging signal than to receive one, this approach saves SS power and battery life.

Figures 4A, 4B, 4C, 4D:
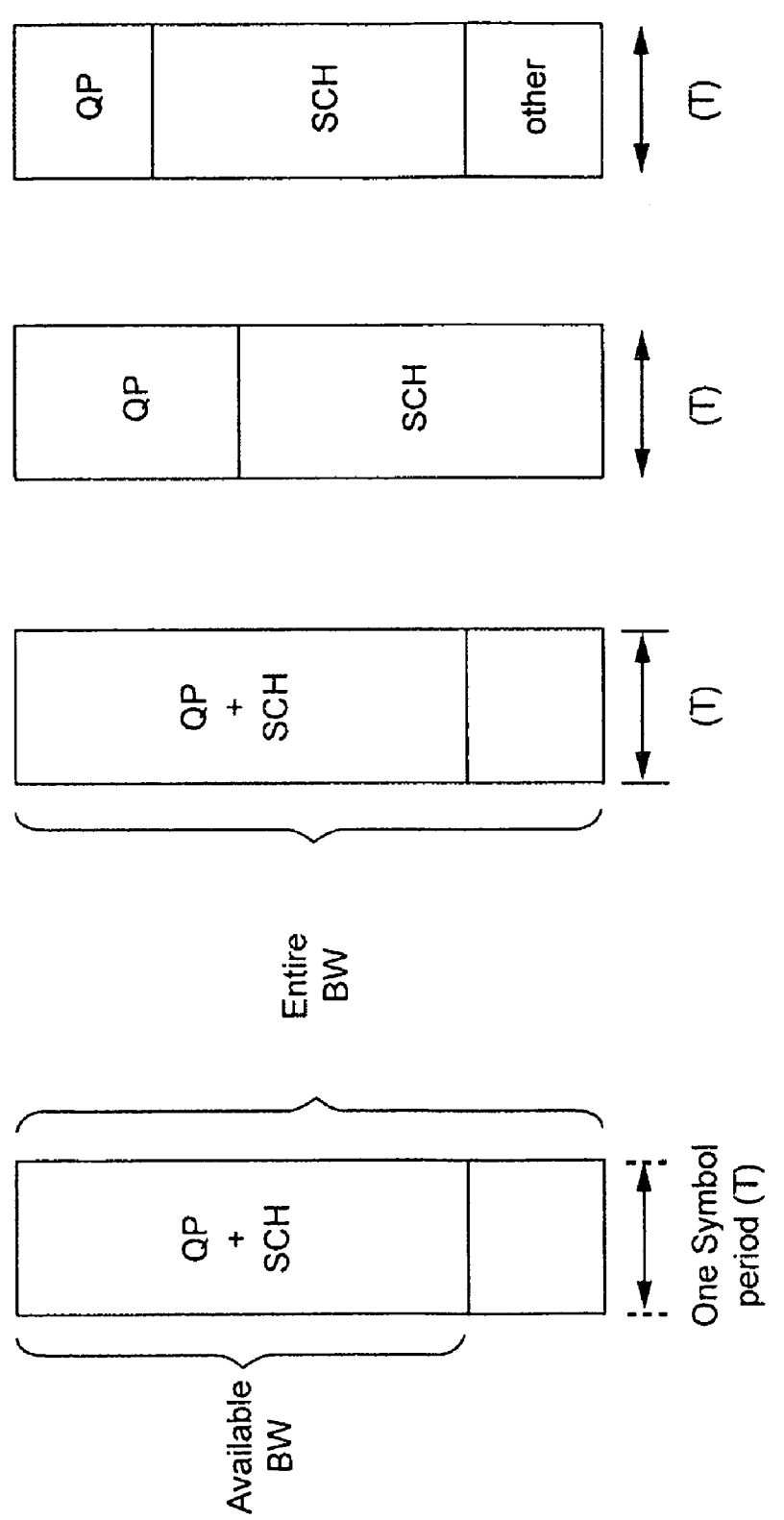
FIGS. 4A-4D illustrate different non-limiting formats for subcarriers for carrying both quick paging and synchronization signals during the same symbol transmission time period.

FIGS. 4A-4D illustrate (conceptually) different non-limiting example signal formats carrying both quick paging and synchronization signals during the same OFDMA symbol transmission time period. FIG. 4A shows that an entire bandwidth of subcarriers during the one symbol period (T) are available to carry simultaneously both the synchronization signal and the quick paging signal. One example way of implementing that simultaneous transmission is to send the synchronization signal on every Nth subcarrier and then to have other unused subcarriers carry the quick paging signal. The quick paging signals carried by unused subcarriers in this available bandwidth are preferably coded and transmitted at a significantly lower power level than the synchronization signal subcarriers. In this way, the synchronization signal has the desirable periodicity over that entire available portion of the frequency bandwidth. As for coding the quick paging signal, a first quick paging code word carried over multiple ones of the unused subcarriers may indicate that a paging signal will be subsequently transmitted. A second quick paging code word carried over multiple ones of the unused subcarriers may indicate that the paging signal will not be subsequently transmitted. Some or all of the unused subcarriers may be used to carry the quick paging signal. Pilot symbols having known symbol values may also be transmitted as part of the quick paging signal (e.g., on certain predetermined and pre-specified subcarriers) in order to enable the SS to estimate of the channel for demodulation purposes. The SS also knows the synchronization signal, e.g., a preamble code, transmitted on the SCH and can use this known signal to enhance the channel estimation needed to demodulate the quick paging signal.

The quick paging signal disrupts the periodicity of the synchronization signal. Accordingly, the output power of the quick paging signal is set sufficiently low compared to the synchronization signal to make this disturbance sufficiently small so as not to significantly interfere with the synchronization process. In the case where the synchronization channel is shifted with a number of subcarriers in different cells/sectors, the quick paging signal uses subcarriers that are also used by the synchronization channel of neighbor cells/sectors. Thus, the quick paging signal creates interference for these synchronization channels. Again, the output power of the quick paging signal is set sufficiently low compared to the synchronization channels to make this interference sufficiently small so as not to disturb the synchronization process in these cells/sectors.

FIG. 4B shows another example where the synchronization and quick paging signals are transmitted using a set of subcarriers corresponding to just a part of the entire bandwidth for the symbol transmission period T (a first sub-band). Other types of signals may be carried using the remaining bandwidth (a second sub-band) for the symbol transmission period T. The synchronization and quick paging signals in the first sub-band may be transmitted using the interspersed subcarrier approach shown in FIG. 4A. In the case where the synchronization channel is restricted to a frequency contiguous sub-band of the full carrier bandwidth, as illustrated here and in FIG. 4A, the quick paging signal is restricted to the same frequency contiguous sub-band.

This format in FIG. 4B may be used if there are SSs that cannot receive the entire system bandwidth. In that case, only a portion of the bandwidth is used for the SCH to allow those SSs to perform synchronization. Another advantage is that additional information can be carried along with the synchronization signal and the quick paging signal in this example. But a disadvantage relates to a potential loss of the desirable periodicity property for the synchronization signal since it is no longer periodically transmitted on very Nth subcarrier for the entire bandwidth. However, the desirable periodicity may be achieved by suitable filtering/signal processing at the receiver as described in more detail below which allows the receiver to isolate just the first sub-band.

FIG. 4C shows another example where the synchronization and quick paging signals are transmitted simultaneously over the entire available bandwidth for the symbol transmission period T. However, the quick paging signal is sent using subcarriers in a first sub-band, and the synchronization signal is sent using subcarriers in a second sub-band. This example has the advantage that the quick paging signals do not interfere with the periodicity of the synchronization signals because they are in separate sub-bands. The receiver can filter out one or both of the sub-bands for further processing. This receiver filtering allows the periodicity of the synchronization signal to be preserved. At the same time, the quick paging signal can be transmitted at a higher power level than in the example where the synchronization and quick paging signals are transmitted simultaneously and interspersed within the same band.

FIG. 4D shows another example where the synchronization and quick paging signals are transmitted using separate sub-bands in the entire bandwidth for the symbol transmission period T, e.g., a first sub-band and a second sub-band. Other types of signals may be carried using the remaining bandwidth corresponding to a third sub-band during the symbol transmission period T. This example has similar benefits as the example in FIG. 4C but also allows additional other signals to be transmitted if the entire bandwidth need not be committed to the synchronization and quick paging signals.

Figure 5:
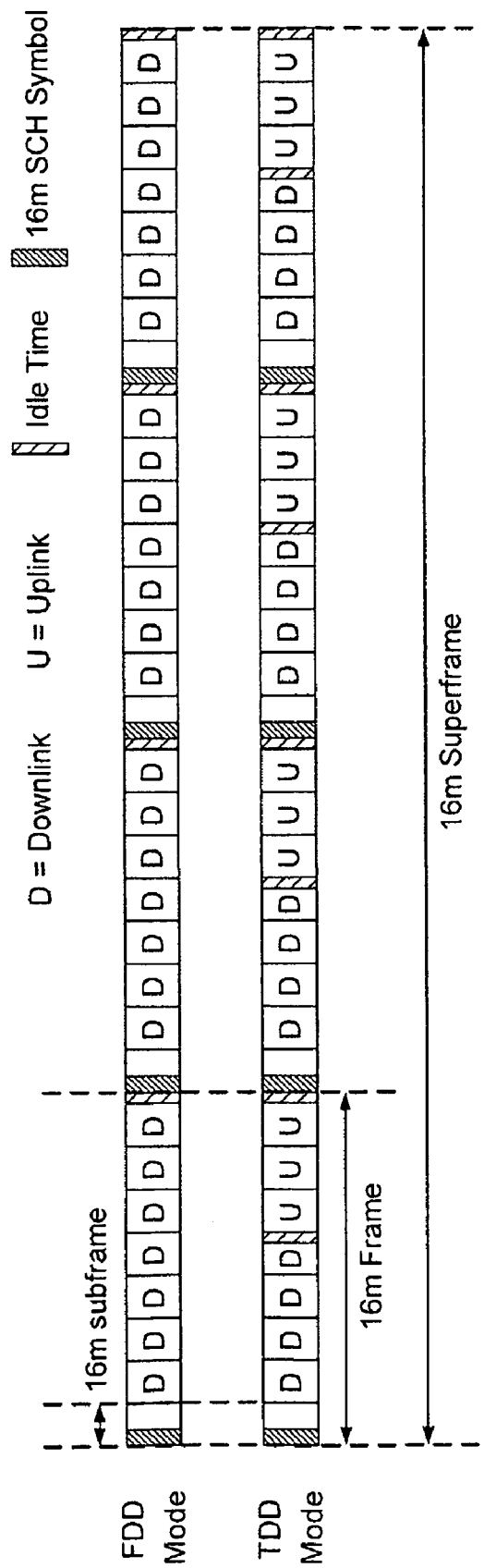
FIG. 5 illustrates a possible non-limiting WiMAX (802.166 m) type superframe including four frames.

FIG. 5 illustrates conceptually an example non-limiting WiMAX type superframe including four frames that is possible for IEEE 802.16m. Each frame includes eight subframes along with one or two idle time intervals, depending on whether operation is in FDD or TDD mode. In this example, the SCH and quick paging signals can be transmitted in the first subframe of every 802.16m frame using for example one of the formats shown in FIGS. 4A-4D or some other suitable format. The first subframe preferably also includes downlink (D) data as do all of the subsequent seven subframes of each frame for FDD mode. In TDD mode, some subframes are used for downlink data (D) while the remaining subframes are used for uplink data. In FIG. 5, this is exemplified by the first five subframes being used for downlink data (D) while the last three subframes are being used for uplink (U) data.

Figure 6:
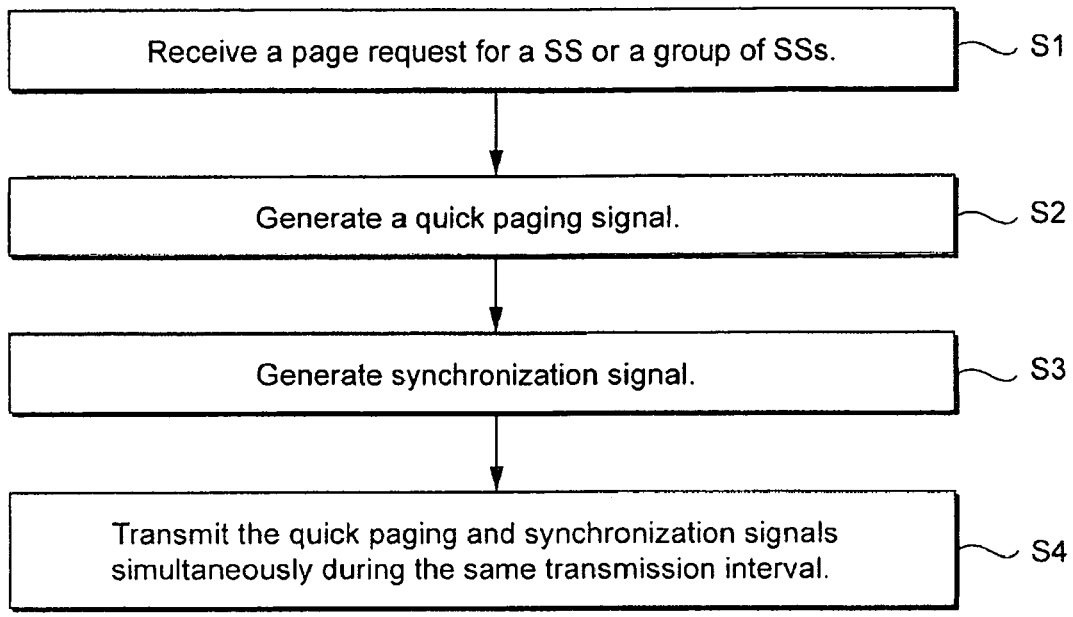
FIG. 6 is a flow chart showing non-limiting example procedures for use in a base station to generate quick paging and synchronization signals and transmit them together during the same symbol transmission time period.

FIG. 6 is a flow chart showing non-limiting example procedures for use in a base station to generate quick paging and synchronization signals and transmit them together during the same symbol transmission time period. Initially, the base station receives a page request for a subscriber station (SS) or a group of subscriber stations (SSs) (step S1). The base station then generates a quick paging signal, e.g., a quick paging code, (step S2), and a synchronization signal (step S3). The quick paging signal and the synchronization signal are transmit simultaneously during a same transmission symbol time period (step S4). Thus, the synchronization signal and the quick paging signal share some or all of the available radio resources during the transmission symbol time period.

Figure 7:
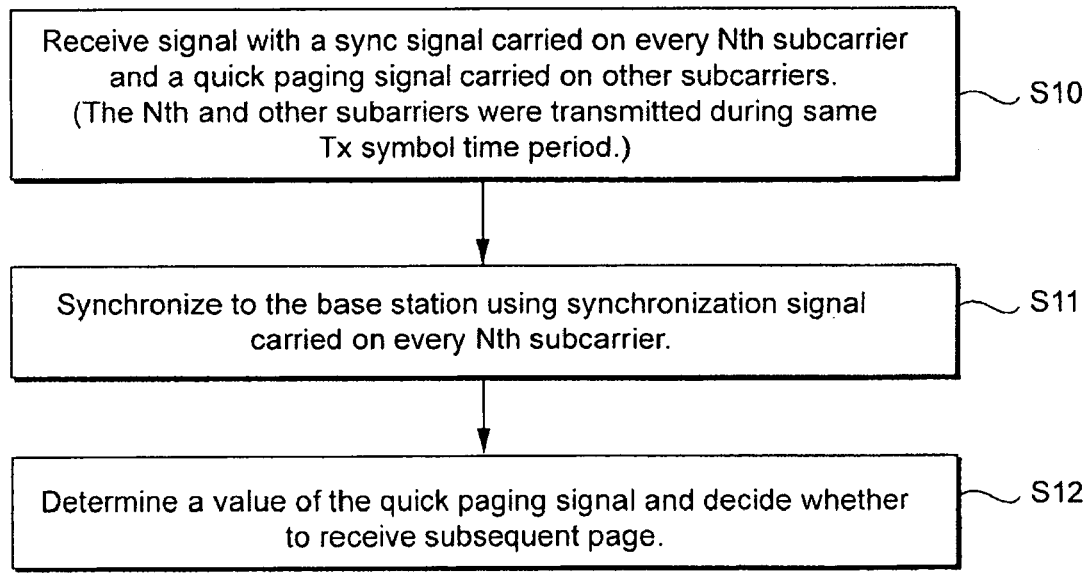
FIG. 7 is a flow chart showing non-limiting example procedures for use in a subscriber station to receive and process a signal including quick paging and synchronization signals that were transmitted together during the same symbol transmission time period.

FIG. 7 is a flow chant showing non-limiting example procedures for use in a subscriber station (SS) to receive and process a signal including quick paging and synchronization signals that were transmitted together during the same symbol transmission time period. Initially, a signal is received that includes a synchronization signal carried on every Nth subcarrier in a set of subcarriers, N being a positive integer, and a quick paging signal carried on other subcarriers different from the Nth subcarriers (step S10). The Nth and other subcarriers were transmitted together by a base station during a same transmission symbol time period. Channel estimates are preferably obtained from the SCH portion of the received signal which may be advantageously used to facilitate quick paging signal detection.

For the interspersed example embodiments where the synchronization and quick paging signals are interspersed in the same band or sub-band, a non-limiting, numerical example is provided for illustration to show how coding can be used to generate a satisfactory lower power quick paging signal that can be accurately received but sufficiently low in power that it does not have a significant impact on the synchronization signal. Assume a 5 MHz wide synchronization channel (SCH). This may be the full system bandwidth or a sub-band of a full system bandwidth of, e.g., 10, 15, 20,or 40 MHz. Assume every third out of 429 OFDMA subcarriers in the 5 MHz bandwidth/sub-band is used for the SCH, i.e., N=3,so that up to 286 subcarriers may be used for the quick paging signal. The quick paging signal can be coded and mapped on the 286 subcarriers in many different ways. A simple example for illustration purposes uses codeword's of a length 256 Walsh-Hadamard code having 256 orthogonal codewords. One codeword is sent over 256 out of the 286 available subcarriers. Two of these codewords are assigned to each quick paging group: one that signals the presence of a paging signal on the next frame, and one that signals the absence of the paging signal. The receiver can correlate these two codewords to the signal received over the previously identified sub-carriers to determine which quick paging signal is received.

The receiver can decode the received signal using knowledge of the radio channel. As explained in the description of FIG. 7, the channel can be estimated using the SCH signal. In this example, the receiver calculates correlation metrics for the two codewords assigned to its quick paging group, and makes a determination based on the difference between the metrics. Since aggregation of signal energy over 256 subcarriers is being used by the correlator, it is reasonable to expect that the signal power for this quick paging signal can be (if desired) 256 times (or about 24 dB) lower than the synchronization signal. Thus, the disturbance of the periodicity property for the SCH caused by the quick paging code will be very small, the interference caused to other cells will be quite small, and the impact on cell selection will be negligible. Reselection and handover measurements may also be performed using measurements on SCH signals.

In another non-limiting example for the same band/sub-band embodiments, the SCH utilizes every second out of 429 OFDMA subcarriers in a 5 MHz bandwidth/sub-band, i.e., N=2,so that up to 214 subcarriers may be used for the quick paging signal. If 128 length Walsh-Hadamard codes are used in this example, it is reasonable to expect that the signal power for this quick paging signal can be 128 times (or about 21 dB) lower than normal signals. Alternatively, if a 212 length (non-linear) Hadamard code is used, then the expected signal power gain is 212 times or about 22 dB.

Example embodiments are now described where a quick paging signal is transmitted on the subcarriers in the same symbol transmission period that carry the SCH, but using a different sub-band of subcarriers than those that carry the synchronization signal. Within its sub-band of the total available bandwidth, the SCH signal is carried only on every Nth subcarrier within a subset of subcarriers corresponding to the first sub-band to facilitate synchronization at the receiver as already explained. The quick paging (QP) signal is sent on the same symbol transmission time period as the SCH signal, but on a different sub-band. By using different first and second sub-bands, the quick paging signal can be sent using the same power as the synchronization signal or at a different power. Since the quick paging signal is not operating at a low power, conventional coding schemes such as block, convolutional, or turbo codes can be used to encode the quick paging signal that may be transmitted using robust modulations such as BPSK or QPSK, or other modulations such as QAM.

As mentioned above, the SS can filter out, using an analog or a digital filter, a sub-band containing the SCH to exploit any periodic signal properties of the synchronization signal. The SS may also filter out the sub-band containing the quick paging signal and demodulate it separately from the synchronization signal. Alternatively, the SS may receive the entire frequency band, isolate the sub-band containing the QP signal, and demodulate it. In this alternative, knowledge of the SCH signal can be used for channel estimation and fine synchronization purposes.

Figure 8:
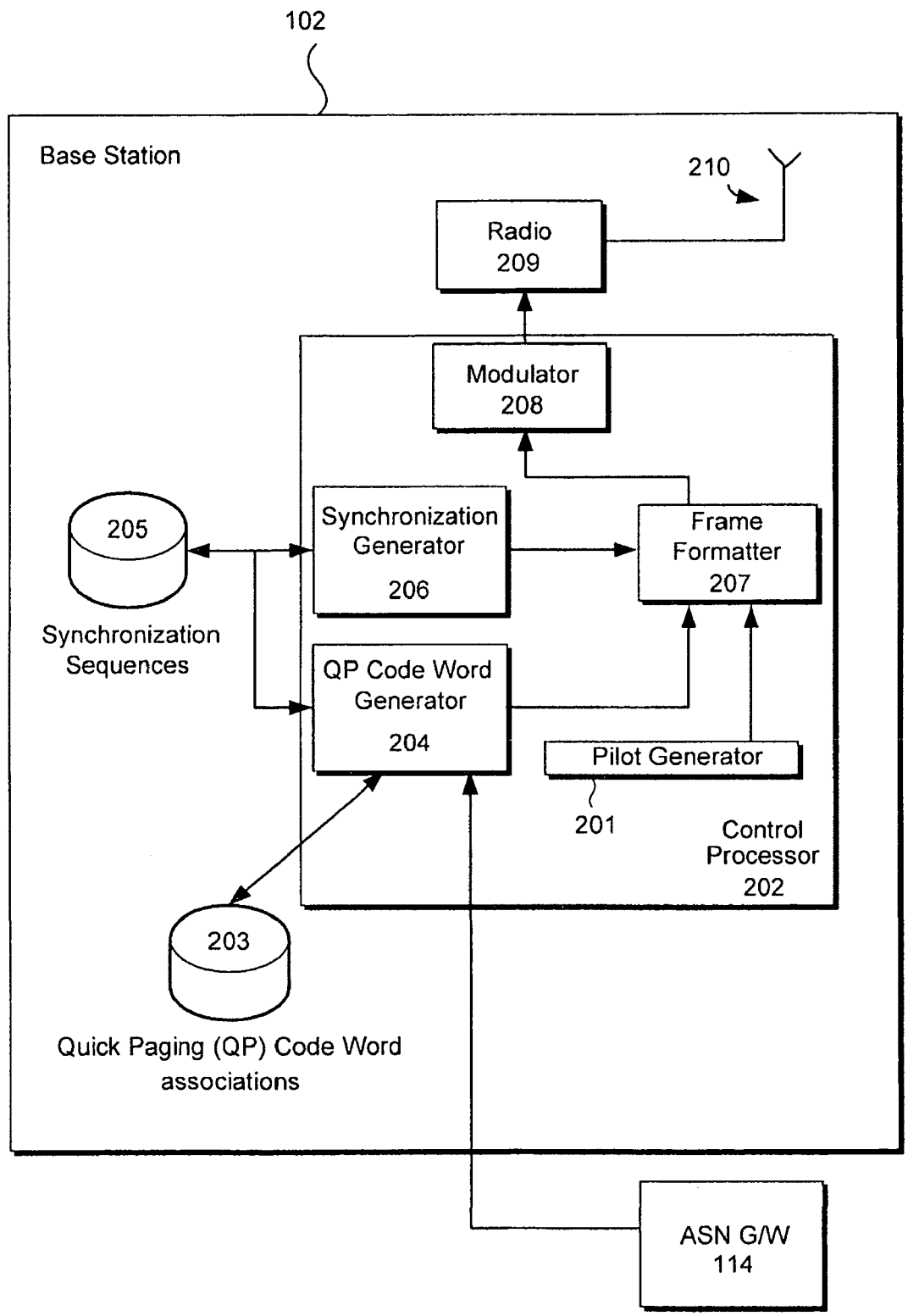
FIG. 8 is a non-limiting, example function block diagram illustrating a portion of a base station associated with implementing certain features described in this application.

FIG. 8 is a non-limiting, example unction block diagram illustrating a portion of a base station associated with implementing certain features described in this application. It will be appreciated that the functional blocks can be combined and re-arranged in a variety of equivalent ways, and that many of the functions can be performed by one or more suitably programmed digital signal processors and other known electronic circuits.

The BS 102 is operated by a control processor 202, which typically and advantageously is a suitably programmed digital signal processor. The control processor 202 typically provides and receives control and other signals from various devices in the BS 102. For simplicity, the control processor 202 is shown exchanging information with a suitable memory 203, which is a repository of associations between quick paging code words and SSs and other information useful for sorting one or more SSs into paging groups as described above.

Such information is provided to a quick paging code word generator 204, which uses the information to generate quick paging setup information for transmission to SSs in communication with the 13S 102. The quick paging code word generator 204 also generates selected quick paging code words for transmission to one or more SSs and paging groups. For that purpose, the generator 204 can produce suitable code word sequences, such as Walsh-Hadamard sequences, as described in examples above, or retrieve unused conventional synchronization sequences from a synchronization sequence memory 205. The quick paging code word generator 204 can also be configured to mask the selected quick paging code words by combining those code words with a PN sequence. Although the generator 204 is depicted as part of the control processor 202, this is not necessary; the generator 204 as well as one or more other devices depicted as part of the processor 202 can be implemented by dedicated programmed processors or other suitable logic configured to perform their functions.

The control processor 202 also may include a pilot generator 201 that generates pilot symbols having known symbol values to be sent over a set of subcarriers that does not include subcarriers that carry either the synchronization signal or the quick paging code word(s). A synchronization signal generator 206 also retrieves stored one or more synchronization signal sequences from the memory 205 that may then be used for producing the synchronization signal transmitted by the BS 102 on the SCH.

The quick paging code word generator 204 provides the setup information and/or the selected quick paging code words to a frame formatter 207, which also receives the synchronization signal generated by the synchronization signal generator 206 and any pilot signal generated by the pilot generator 201. The frame formatter 607 combines the setup information or quick paging code words with the synchronization signal, pilot, and other data in a DL frame or subframe to be transmitted. The combined information stream is converted by a suitable OFDM modulator 208 into modulation symbols that are provided to an OFDM radio transmitter 209, which impresses the modulation symbols on suitable subcarrier signals. The modulated subcarrier signals are transmitted through a suitable antenna 210.

As described above, the BS 102 responds to a request by the network to reach a SS or group of SSs by transmitting the quick paging code word(s) associated with the SS(s). In FIG. 8, such a request is shown as provided through an ASN gateway 114 to control processor 202 and quick paging code word generator 204. In response to the request, the generator 204 retrieves the code word(s) or code word ID(s) associated with the desired SS(s) from the memory 203, and generates the appropriate quick paging signal for transmission by the BS 102.

Figure 9:
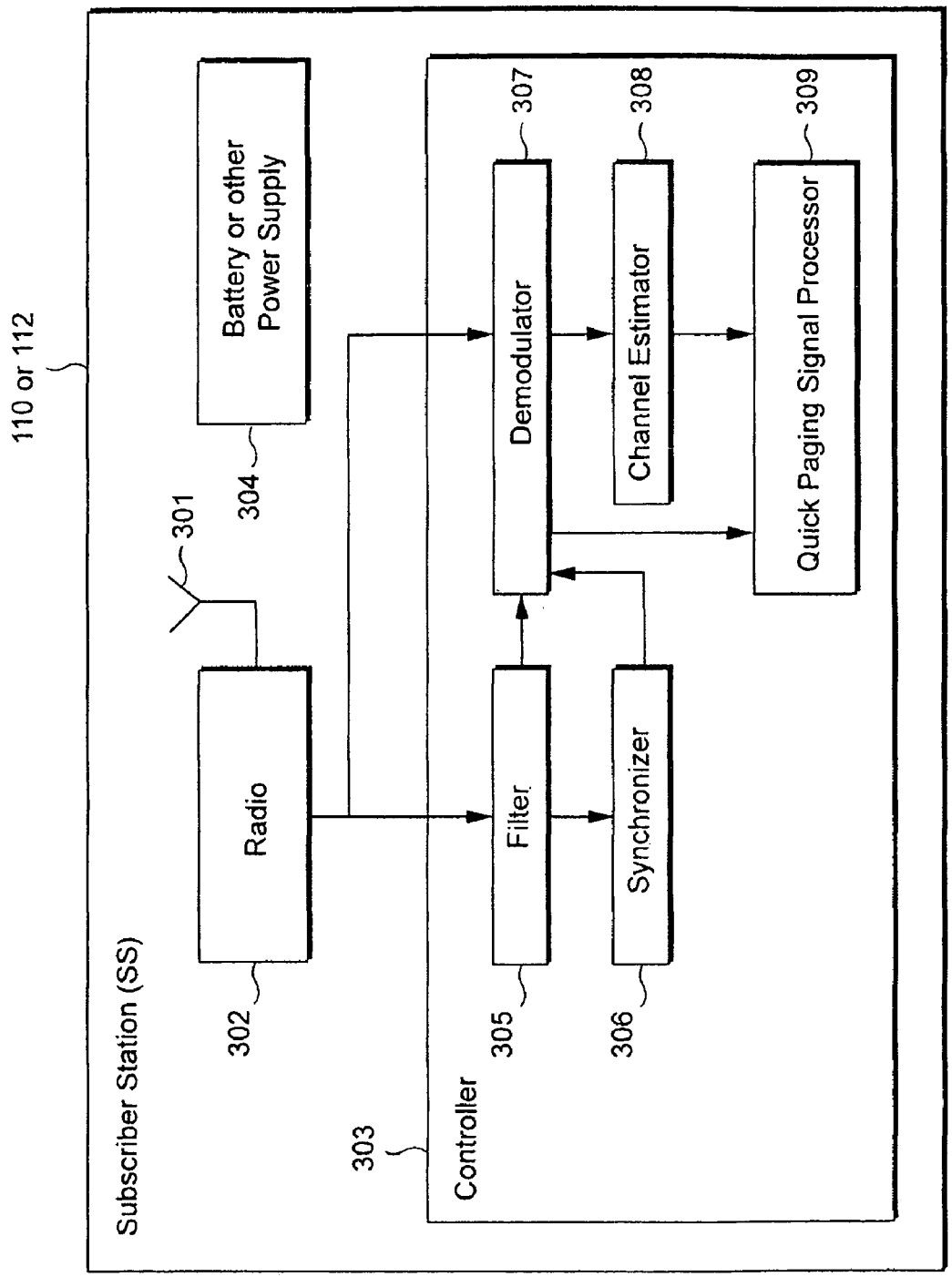
FIG. 9 is a non-limiting, example function block diagram illustrating a portion of a subscriber station associated with implementing certain features described in this application.

FIG. 9 is a non-limiting, example function block diagram illustrating a portion of a subscriber station 110 or 112 associated with implementing certain features described in this application. The SS can receive and/or determine the quick paging setup information and code words for the methods described above. It will be appreciated that the functional blocks can be combined and re-arranged in a variety of equivalent ways, and that many of the functions can be performed by one or more suitably programmed digital signal processors and other known electronic circuits.

The receiver portion for the SS includes a suitable antenna 301 for receiving DL signals transmitted by base stations. The received signals are provided to a suitable OFDM radio receiver 302 that spectrally translates the received signals to a more convenient portion of the spectrum, e.g., baseband. The baseband signal produced by the radio 302 is provided to in two branches to a controller 303. The radio 302 and controller 303 are powered by a battery or other power supply 304. The controller 303 includes a filter 305 that can be an analog or digital filter for filtering a first branch of the baseband signal in order to isolate the sub-band where the synchronization signal is present for initial synchronization. That isolated sub-band is provided to a synchronizer 306 which tries to detects a signal with the Nth carrier periodicity in the time domain. The synchronizer 306 detects the repetitive property of the periodic synchronization signal and achieves synchronization with the base station. A signal boundary in time, i.e., the sync position, is determined as a result of synchronization. The synchronizer 306 may also use this approach to subsequently maintain and/or resynchronize to the base station given that the SS timing may drift during periods when it is a sleep state.

The synchronizer 306 provides the sync position, e.g., as a control signal, to a demodulator 307 which uses it to perform OFDM demodulation, using an FFT for example, on the baseband signal provided from the radio 302 on the second branch. The demodulator 307 provides the demodulated signal to a channel estimator 308 which obtains channel estimates from the demodulated synchronization portion of the baseband signal or pilot symbols carried on subcarriers not carrying the synchronization or quick paging signals. The channel estimates and the demodulated signal are provided to a quick paging signal processor 309. The quick paging processor 309 decodes the baseband signal to extract the quick paging information based on channel estimates generated by the channel estimator 308 from the synchronization signal and possibly also pilot signals included with the quick paging signal itself. For example, if the quick paging signal corresponds to one of multiple orthogonal quick paging code words carried on the other subcarriers, then the quick paging signal processor 309 may correlate the demodulated signal with one of the quick paging code words associated with the subscriber station. The quick paging processor 309 processes the quick paging signal to determine whether the SS needs to wake up in a subsequent frame to read a conventional paging signal.

Figure 10:
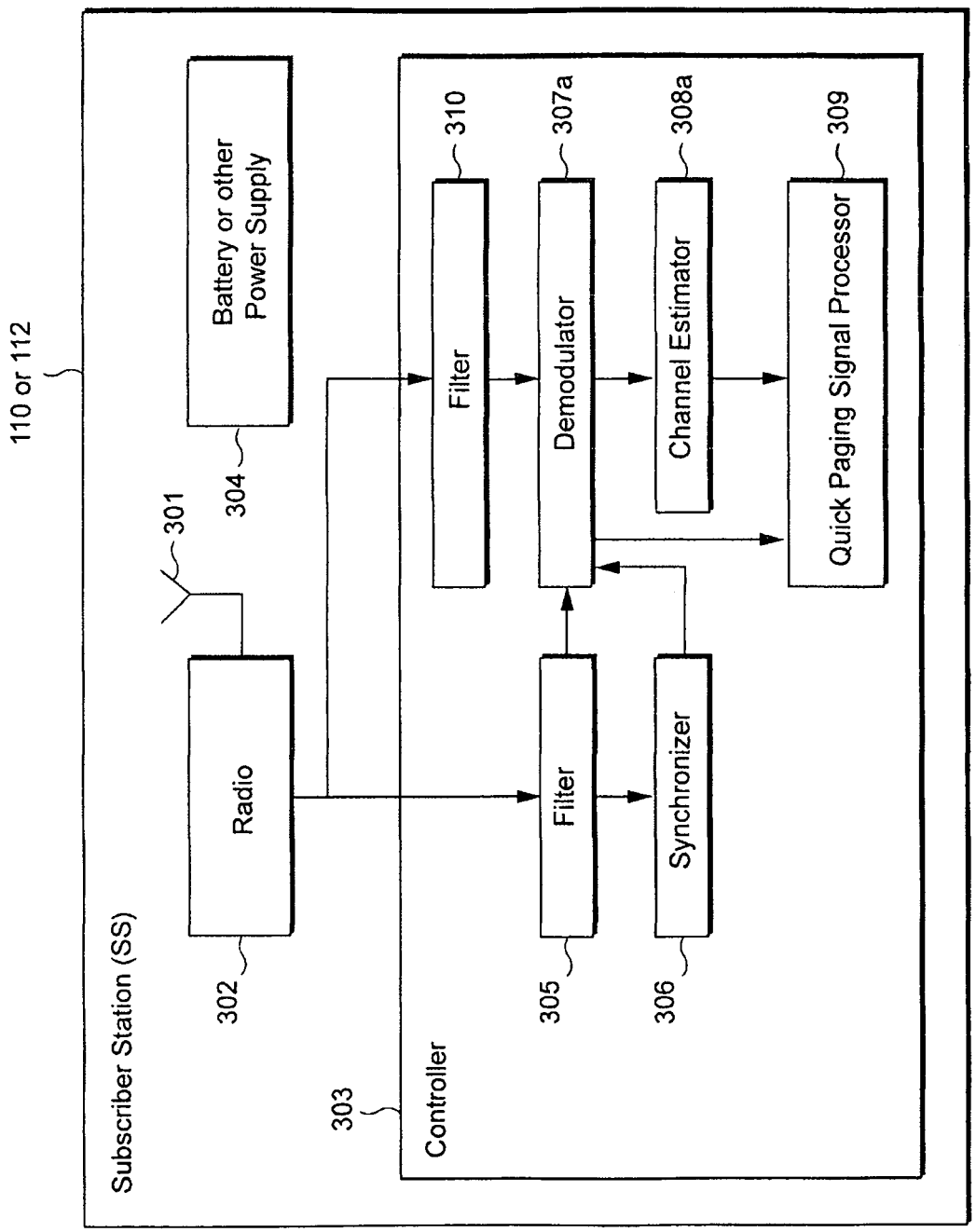
FIG. 10 is a non-limiting, example function block diagram illustrating a portion of a subscriber station for another example embodiment associated with implementing certain features described in this application.

In an alternative example embodiment shown in FIG. 10, the baseband signal on a second branch is passed through a second filter 310 that isolates the sub-band where the quick paging signal is present. The synchronization information from the first branch is passed to the second branch, and detection of the quick paging signal is done on the filtered signal on the second branch. The smaller bandwidth of the second branch enables a simpler demodulator 307a for the signal before the quick paging detection is done. The channel estimator 308a preferably estimates channel information from pilot symbols that are present in the same sub-band as the quick paging signal.

Moreover, this technology can additionally be embodied entirely within any form of computer-readable storage medium having stored therein an appropriate set of instructions for use by or in connection with an instruction-execution system, apparatus, or device, such as a computer-based system, processor-containing system, or other system that can fetch instructions from a medium and execute the instructions. As used here, a computer-readable medium can be any means that can contain, store, communicate, or transport the program for use by or in connection with the instruction-execution system, apparatus, or device. The computer-readable medium can be, for example but not limited to, an electronic, magnetic, optical, electromagnetic, infrared, or semiconductor system, apparatus, device, or medium.

There are multiple advantages with this technology. First, this technology saves radio resources by not sending the SCH over the all the subcarriers in the entire bandwidth. Second, it still maintains the periodicity benefits of a SCH, which are important for initial synchronization purposes over entire bandwidths than can be received by some SSs, and well-identified sub-bands that can be received as portions of the entire bandwidths by other MS. This is particularly helpful for a SS that is not capable of receiving the entire system bandwidth. Third, the technology reduces power consumption for an inactive or idle SS because the SS needs to wake up only during the SCH transmission to read the quick paging signal. Fourth, quick paging is performed without requiring additional time and frequency resources beyond those already used for the SCH. Fifth, in the sub-band embodiments, the quick paging signal can be transmitted at full power without significantly interfering with the SCH signal, which is a more flexible signal design.

Although various embodiments have been shown and described in detail, the claims are not limited to any particular embodiment or example. None of the above description should be read as implying that any particular element, step, range, or function is essential such that it must be included in the scope of the claims. The scope of patented subject matter is defined only by the claims. The extent of legal protection is defined by the words recited in the allowed claims and their equivalents. Reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. It is not necessary for a device or method to address each and every problem sought to be solved by the present technology, for it to be encompassed by the present claims. No claim is intended to invoke paragraph 6 of 35 USC §112 unless the words "means for" or "step for" are used. Furthermore, no embodiment, feature, component, or step in this specification is intended to be dedicated to the public regardless of whether the embodiment, feature, component, or step is recited in the claims.

What is claimed is:

1. A method of quick paging in a communication system that uses a plurality of subcarriers for orthogonal frequency division multiple access (OFDMA) and radio resources that include a first set of contiguous subcarriers corresponding to an available frequency bandwidth during a transmission symbol time period, comprising:

transmitting a synchronization signal on every Nth subcarrier in the first set of contiguous subcarriers during the transmission symbol time period, N being a positive integer, such that periodicity of transmission of the synchronization signal is maintained over at least part of the available frequency bandwidth; and transmitting quick paging signals using orthogonal quick paging code words on subcarriers in the first set of contiguous subcarriers other than the Nth subcarriers during the transmission symbol time period, wherein the orthogonal quick paging code words include Walsh-Hadamard code words;

simultaneously transmitting the synchronization signal and the quick paging signal using shared available radio resources during the same transmission symbol time period, and wherein transmitting a first quick paging code word indicates that a paging signal will be subsequently transmitted and transmitting a second quick paging code word indicates that the paging signal will not be subsequently transmitted.

2. The method of claim 1, wherein the orthogonal quick paging codewords are transmitted at a power level lower than a power level used to transmit the synchronization signal.

3. The method of claim 1, wherein subcarriers used to transmit a synchronization signal in different cells or sectors are shifted by a number of subcarriers to reduce interference.

4. The method of claim 1, further comprising transmitting pilot symbols having known symbol values during the transmission symbol time period.

5. The method of claim 1, wherein each orthogonal quick paging code word identifies a set of subscriber terminals or groups of subscriber terminals that a base station is planning on transmitting a paging signal.

6. A method for use in a subscriber station communicating in a communication system using a plurality of subcarriers for orthogonal frequency division multiple access (OFDMA), comprising:

receiving a signal that includes a synchronization signal carried on every Nth subcarrier in a set of subcarriers, N being a positive integer, and a quick paging signal carried on other subcarriers different from the Nth subcarriers, where the Nth and other subcarriers were transmitted simultaneously by a base station during a same transmission symbol time period and where the quick paging signal includes one of a first orthogonal quick paging code word and a second orthogonal quick paging code word, wherein the first and second orthogonal quick paging code words include Walsh-Hadamard code words;

determining whether the first orthogonal quick paging code word or the second orthogonal quick paging code word' is received during the transmission symbol time period; and determining whether to receive a subsequent paging signal based on whether the orthogonal quick paging code word received during the transmission symbol time period is the first orthogonal quick paging code word or the second orthogonal quick paging code word.

7. The method in claim 6, wherein if the orthogonal quick paging code word received during the transmission symbol time period is the first orthogonal quick paging code word, receiving the subsequent paging signal, and if the orthogonal quick paging code word received during the transmission symbol time period is the second orthogonal quick paging code word, going into a power saving operational mode for the subscriber station.

8. The method in claim 6, further comprising synchronizing with the base station using the synchronization signal carried on every Nth subcarrier in the set of subcarriers.

9. The method in claim 8, wherein:

the set of subcarriers define a first frequency band of contiguous subcarriers, the other subcarriers carrying an orthogonal quick paging code word are in the first frequency band but are different from the Nth subcarriers, the Nth subcarriers carrying the synchronization signal are received at a higher power level than the other subcarriers carrying an orthogonal quick paging code word, and the method further comprising:

correlating the quick paging signal with one of the orthogonal quick paging code words associated with the subscriber station.

10. The method in claim 8, wherein:

the set of subcarriers define a first frequency sub-band of contiguous subcarriers, the other subcarriers carrying the quick paging signal are part of a second different frequency sub-band, the set of subcarriers carrying the synchronization signal are received at a same power level as the other subcarriers carrying the quick paging signal, and processing the received signal to detect repetitive signal properties of the synchronization signal for synchronization with the base station.

11. The method in claim 10, further comprising:

filtering the signal to isolate the set of subcarriers, and processing the filtered signal to detect repetitive properties of the synchronization signal.

12. The method in claim 8, wherein:

the set of subcarriers define a first frequency sub-band of contiguous subcarriers, the other subcarriers carrying an orthogonal quick paging code word are part of a second different frequency sub-band, the set of subcarriers carrying the synchronization signal are received at a same power level as the other subcarriers carrying the orthogonal quick paging code word, processing the received signal to isolate the second frequency sub-band, and demodulating the isolated second frequency sub-band to detect quick paging information.

13. The method in claim 6, further comprising:
detecting known pilot symbols with the orthogonal quick paging code word;
using the detected pilot symbols to determine radio channel estimates; and
processing the orthogonal quick paging code word using the determined radio channel estimates.

14. The method in claim 6, further comprising
using the synchronization signal to determine radio channel estimates; and
processing the orthogonal quick paging code word using the determined radio channel estimates.

15. Apparatus for a transmitter for sending quick paging and synchronization signals in a communication system that uses a plurality of subcarriers for orthogonal frequency division multiple access (OFDMA) and, comprising:
a signal generator arranged to generate a synchronization signal and an orthogonal quick paging code word; and
processing circuitry arranged to provide the orthogonal quick paging code word and the synchronization signal for simultaneous transmission on different OFDMA subcarriers during a same transmission symbol time period, wherein the processing circuitry is arranged to provide the synchronization signal for transmission on every Nth subcarrier in the first set of subcarriers, N being a positive integer and the orthogonal quick paging code word includes a Walsh-Hadamard code word,
wherein the synchronization signal and the orthogonal quick paging code word share available radio resources during the transmission symbol time period, and wherein subcarriers used to transmit a synchronization signal in different cells or sectors are shitted by a number of subcarriers to reduce interference,
wherein transmitting a first quick paging code word indicates that a paging signal will be subsequently transmitted and transmitting a second quick paging code word indicates that the paging signal will not be subsequently transmitted.

16. The apparatus in claim 15, wherein the available radio resources include a first set of subcarriers corresponding to an entire available frequency bandwidth during the transmission symbol time period; and
wherein the processing circuitry is arranged to provide the synchronization signal for transmission on every Nth subcarrier in the first set of subcarriers, N being a positive integer, such that periodicity of transmission of the synchronization signal is maintained over the entire available frequency bandwidth.

17. The apparatus in claim 16, wherein the processing circuitry is arranged to provide the orthogonal quick paging code word for transmission on subcarriers in the first set of subcarriers other than the Nth subcarriers.

18. The apparatus in claim 15, wherein the available radio resources include a first set of contiguous subcarriers corresponding to part of an entire available frequency bandwidth during the transmission symbol time period;
wherein the processing circuitry is arranged to provide the synchronization signal for transmission on every Nth subcarrier in the first set of contiguous subcarriers, N being a positive integer, such that periodicity of transmission of the synchronization signal is maintained over the part of the entire available frequency bandwidth.

19. The apparatus of claim 18, wherein the processing circuitry is arranged to provide the orthogonal quick paging code word for transmission on subcarriers in the first set of subcarriers other than the Nth subcarriers.

20. The apparatus of claim 19, wherein the processing circuitry is arranged to provide the orthogonal quick paging code word for transmission at power level lower than a power level used to transmit the synchronization signal.

21. The apparatus of claim 19, wherein transmitting a first orthogonal quick paging code word indicates that a paging signal will be subsequently transmitted and transmitting a second orthogonal quick paging code word indicates that the paging signal will not be subsequently transmitted.

22. The apparatus of claim 18, wherein the processing circuitry is arranged to provide the orthogonal quick paging code word for transmission on subcarriers other than subcarriers in the first set of subcarriers.

23. The apparatus of claim 22, wherein the processing circuitry is arranged to provide the orthogonal quick paging code word for transmission at a same power level as a power level used to transmit the synchronization signal.

24. The apparatus of claim 15, wherein the processing circuitry is arranged to provide pilot symbols having known symbol values for transmission during the transmission symbol time period.

25. The apparatus of claim 15, wherein the orthogonal quick paging code word identifies a set of subscriber terminals or groups of subscriber terminals that a base station is planning on transmitting a paging signal.

26. The apparatus of claim 15, wherein transmitting a first orthogonal quick paging code word indicates that a paging signal will be subsequently transmitted and transmitting a second orthogonal quick paging code word indicates that the paging signal will not be subsequently transmitted.

27. Apparatus for use in a subscriber station for receiving quick paging and synchronization signals in a communication system using a plurality of subcarriers for orthogonal frequency division multiple (OFDM) access, comprising:
an OFDM demodulator arranged to demodulate a received signal that includes a synchronization signal carried on every Nth subcarrier in a set of subcarriers, N being a positive integer, and a quick paging signal carried on other subcarriers different from the Nth subcarriers,
where the Nth and other subcarriers were transmitted simultaneously by a base station during a same transmission symbol time period and where the quick paging signal includes one of a first orthogonal quick paging code word and a second orthogonal quick paging code word, wherein the first and second orthogonal quick paging code words include Walsh-Hadamard code words; and
processing circuitry arranged to determine whether the first orthogonal quick paging code word or the second orthogonal quick paging code word is received during the transmission symbol time period and whether to receive and demodulate a subsequent paging signal based on whether the orthogonal quick paging code word received during the transmission symbol time period is the first orthogonal quick paging code word or the second orthogonal quick paging code word.

28. The apparatus in claim 27, further comprising a controller,
wherein if the orthogonal quick paging code word received during the transmission symbol time period is the first orthogonal quick paging code word, the controller is arranged to control the OFDM demodulator to demodulate the subsequent paging signal, and if the orthogonal quick paging code word received during the transmission symbol time period is the second orthogonal quick paging code word, the controller is arranged to shift the apparatus into a power saving operational mode.

29. The apparatus in claim 27, further comprising synchronizing circuitry arranged to synchronize with the base station using the synchronization signal carried on every Nth subcarrier in the set of subcarriers.

30. The apparatus in claim 29, wherein:
the set of subcarriers define a first frequency band of contiguous subcarriers,
the other subcarriers carrying an orthogonal quick paging code words are in the first frequency band but are different from the Nth subcarriers,
the Nth subcarriers carrying the synchronization signal are received at a higher power level than the other subcarriers carrying an orthogonal quick paging code words, and
the quick paging signal corresponds to one of multiple orthogonal quick paging code words carried on the other subcarriers, the apparatus further comprising:
a correlator for correlating the quick paging signal with one of the orthogonal quick paging code words associated with the subscriber station.

31. The apparatus in claim 29, wherein:
the set of subcarriers define a first frequency sub-band of contiguous subcarriers,
the other subcarriers carrying the quick paging signal are part of a second different frequency sub-band,
the set of subcarriers carrying the synchronization signal are received at a same power level as the other subcarriers carrying the quick paging signal, and
wherein the synchronization circuitry is arranged to process the received signal to detect repetitive signal properties of the synchronization signal for synchronization with the base station.

32. The apparatus in claim 31, further comprising:
a filter for isolating the set of subcarriers, and
wherein the synchronization circuitry is arranged to use the filtered signal to achieve synchronization with the base station.

33. The apparatus method in claim 29, wherein:
the set of subcarriers define a first frequency sub-band of contiguous subcarriers,
the other subcarriers carrying an orthogonal quick paging code word are part of a second different frequency sub-band,
the set of subcarriers carrying the synchronization signal are received at a same power level as the other subcarriers carrying an orthogonal quick paging code word,
wherein the synchronization circuitry is arranged to process the received signal to isolate the second frequency sub-band, and
wherein the OFDM demodulator is arranged to demodulate the isolated second frequency sub-band to detect quick paging information.

34. The apparatus in claim 27, wherein:
the processing circuitry is arranged to detect known pilot symbols with the orthogonal quick paging code word and use the detected pilot symbols to determine radio channel estimates; and
the processing circuitry is arranged to process the orthogonal quickpaging code word using the determined radio channel estimates.

35. The apparatus in claim 27, wherein:
the processing circuitry is arranged to use the synchronization signal to determine radio channel estimates; and
the processing circuitry is arranged to process the quick paging signal using the determined radio channel estimates.

* * * * *

UNITED STATES PATENT AND TRADEMARK OFFICE
CERTIFICATE OF CORRECTION

PATENT NO. : 8,233,428 B2
APPLICATION NO. : 12/364997
DATED : July 31, 2012
INVENTOR(S) : Ernstrom et al.

It is certified that error appears in the above-identified patent and that said Letters Patent is hereby corrected as shown below:

In Fig. 7, Sheet 8 of 11, for Tag "S10", in Line 3, delete "subarriers" and insert -- subcarriers --, therefor.

In Column 2, Line 10, delete "802.16,the" and insert -- 802.16, the --, therefor.

In Column 2, Line 37, delete "1701,but" and insert -- 1701, but --, therefor.

In Column 3, Line 49, delete "802.16e-2005,but" and insert -- 802.16e-2005, but --, therefor.

In Column 4, Line 50, delete "then the" and insert -- and thus the --, therefor.

In Column 6, Line 61, delete "(802.166 m)" and insert -- (802.16 m) --, therefor.

In Column 7, Line 29, delete "description with" and insert -- description of the present invention with --, therefor.

In Column 8, Line 38, delete "N=3" and insert -- N=3, --, therefor.

In Column 9, Lines 54-55, delete "subeaffiers" and insert -- subcarriers --, therefor.

In Column 10, Line 66, delete "chant" and insert -- chart --, therefor.

In Column 11, Line 28, delete "codeword's" and insert -- codewords --, therefor.

In Column 12, Line 25, delete "unction" and insert -- function --, therefor.

In Column 12, Line 46, delete "13S 102." and insert -- BS 102. --, therefor.

Signed and Sealed this
Twelfth Day of February, 2013

Teresa Stanek Rea
*Acting Director of the United States Patent and Trademark Office*

CERTIFICATE OF CORRECTION (continued)
U.S. Pat. No. 8,233,428 B2

In Column 15, Line 8, delete "present claims." and
insert -- present claims. Moreover, it is not necessary for a device or method to address each and every problem sought to be solved by the present invention, for it to be encompassed by the present claims. --, therefor.

In Column 16, Line 10, in Claim 6, delete "word'" and insert -- word --, therefor.

In Column 17, Line 10, in Claim 14, delete "comprising" and insert -- comprising: --, therefor.

In Column 20, Line 6, in Claim 33, delete "apparatus method" and insert -- apparatus --, therefor.